United States Patent [19]
Rogers

[11] Patent Number: 5,758,209
[45] Date of Patent: May 26, 1998

[54] ADJUSTABLE RACK FOCUS STOP AND METHOD OF RACK FOCUS

[76] Inventor: Ronald W. Rogers, 7 Cala Moreya, Laguna Niguel, Calif. 92677

[21] Appl. No.: 823,421

[22] Filed: Mar. 24, 1997

[51] Int. Cl.⁶ .............................. G03B 13/18; G02B 7/02
[52] U.S. Cl. ...................... 396/103; 396/544; 352/140; 359/825
[58] Field of Search ................... 396/76, 103, 130, 396/144, 146, 544; 352/139, 140; 348/357; 359/822, 825

[56] References Cited

U.S. PATENT DOCUMENTS 2,196,097  4/1940  Brown ............................... 396/141
5,465,130  11/1995 Eguchi ............................... 396/103

*Primary Examiner*—A. A. Mathews
*Attorney, Agent, or Firm*—Lyon & Lyon LLP

[57] ABSTRACT

An adjustable rack focus stop on a focusing lens incorporates an arm mounted to the focusing lens housing and extending over the focus ring. A stop in the form of an adjustable band is positioned on the focus ring and includes a catch which is capable of engaging the arm. Two objects at different distances from the lens may be focused on through the focusing of the lens on the second object, adjustment of the stop so that it contacts the arm and then readjusting the focus to the first object. The two objects may be filmed in sequence without turning off the camera by adjusting the focus to engage the catch with the arm when refocusing to the second object.

15 Claims, 2 Drawing Sheets

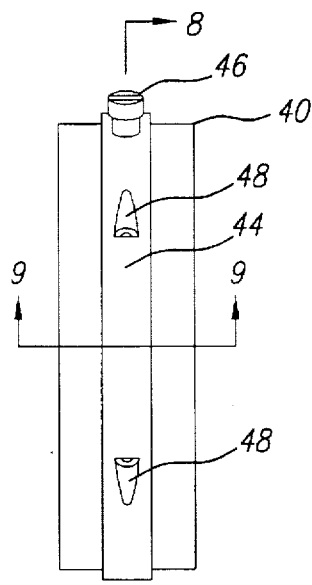
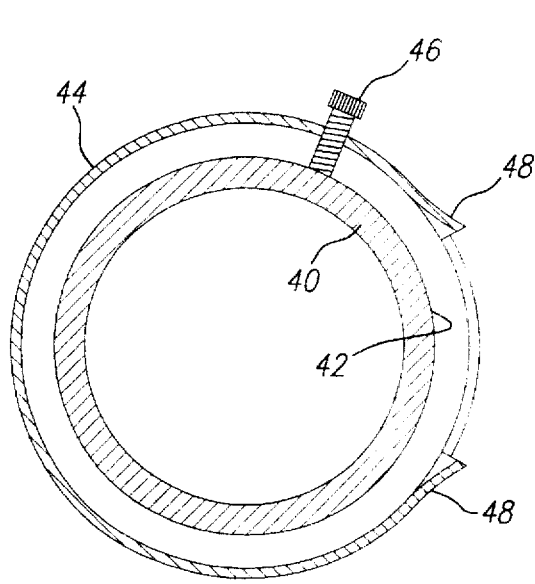
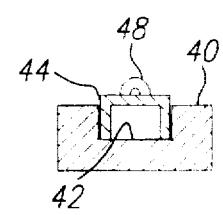
FIG. 7   FIG. 8   FIG. 9
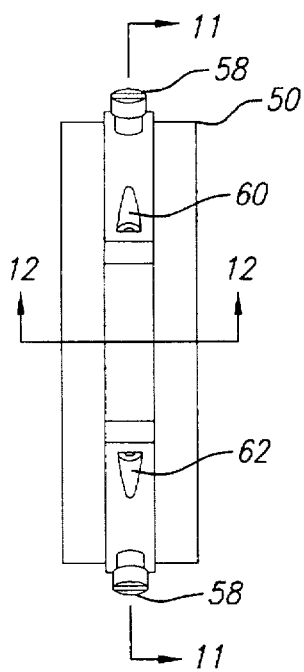
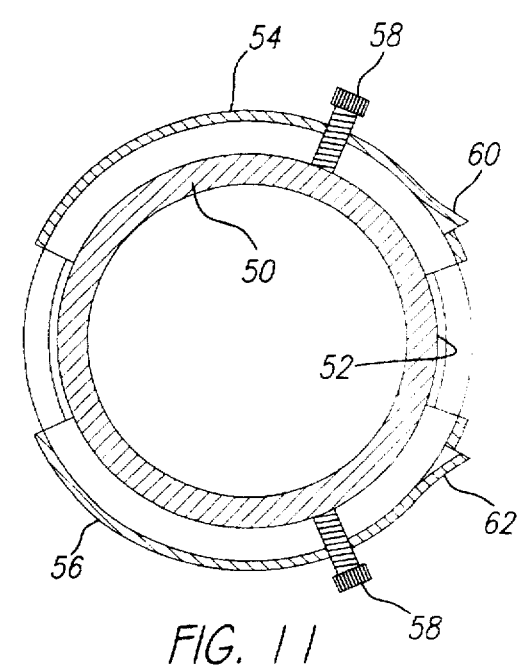
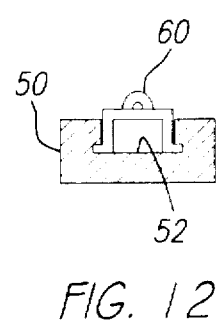
FIG. 10   FIG. 11   FIG. 12

ADJUSTABLE RACK FOCUS STOP AND METHOD OF RACK FOCUS

BACKGROUND OF THE INVENTION

The field of the present invention is focusing lenses for cameras.

With video and film cameras, there is frequently the need to change focus between objects in a scene which are located at different distances from the camera. To insure a proper focus without overrun and hunting, a common practice is to have a second person assist the cameraman. The distance to the second object is first obtained. The first object is then focused on and the camera started. When the camera is to switch to the second object while running, the person assisting the cameraman would manipulate the focus ring to the second position appropriate for the distance between the camera and the second object. There are also powered focus rings for remote focusing.

SUMMARY OF THE INVENTION

The present invention is directed to an adjustable rack focus stop and the method of its use.

In a first, separate aspect of the present invention, an attachment body with an arm is mountable to a camera lens. A stop is also mountable to the camera lens. These devices are fixed to the lens housing and the focus ring so that the stop and the arm will abut at a preselected focus stop. The focus may then be adjusted by the cameraman either manually or automatically without the need for an assistant and without overshooting or hunting for the appropriate focus.

In a second, separate aspect of the present invention, an arm is fixed to the lens housing and an adjustable band with a catch thereon is associated with the focus ring. The catch provides a stop to abut the arm at an appropriate second focus stop.

In a third, separate aspect of the present invention, an arm is fixed to the lens housing and a stop is associated with the focus ring. The stop includes a mounting ring with a central track. One or more catch bodies are slidably positioned in the central track with selective locking.

In a fourth separate aspect of the present invention, a rack focus is achieved by focusing a camera lens on a second object, adjusting a focus stop on the focus ring against an arm located on the lens housing with the focus ring positioned at the second focus. The focus of the lens is then adjusted to the first focus distance and the camera is started. The focus ring is then rotated until the stop and the arm abut to focus on the second object.

In a fifth, separate aspect of the present invention, a rack focus is achieved by focusing a camera lens on a second object, adjusting a focus stop on the focus ring against an arm located on the lens housing with a focus ring positioned at the second focus. The camera lens may then be focused on a first object and the same procedure performed with a second focus stop. The camera is started and may be focused from the first object to the second object and back to the first object by bringing the stops into contact with the arms in sequence while continuously filming.

In a sixth, separate aspect of the present invention, the subject matter of any of the foregoing separate aspects may be combined to provide an improved system.

Accordingly, an improved method and apparatus are provided for rack focus stops. Other and further objects and advantages will appear hereinafter.

BRIEF DESCRIPTION OF THE DRAWINGS

FIG. 7 is a front view of a second embodiment of an adjustable rack focus stop.

FIG. 8 is a cross-sectional view taken along line 8—8 of FIG. 7.

FIG. 9 is a cross-sectional view taken along line 9—9 of FIG. 7.

FIG. 10 is a front view of a third embodiment of an adjustable rack focus stop.

FIG. 11 is a cross-sectional view taken along line 11—11 of FIG. 10.

FIG. 12 is a cross-sectional view taken along line 12—12 of FIG. 10.

DETAILED DESCRIPTION OF THE PREFERRED EMBODIMENT

Figure 1:
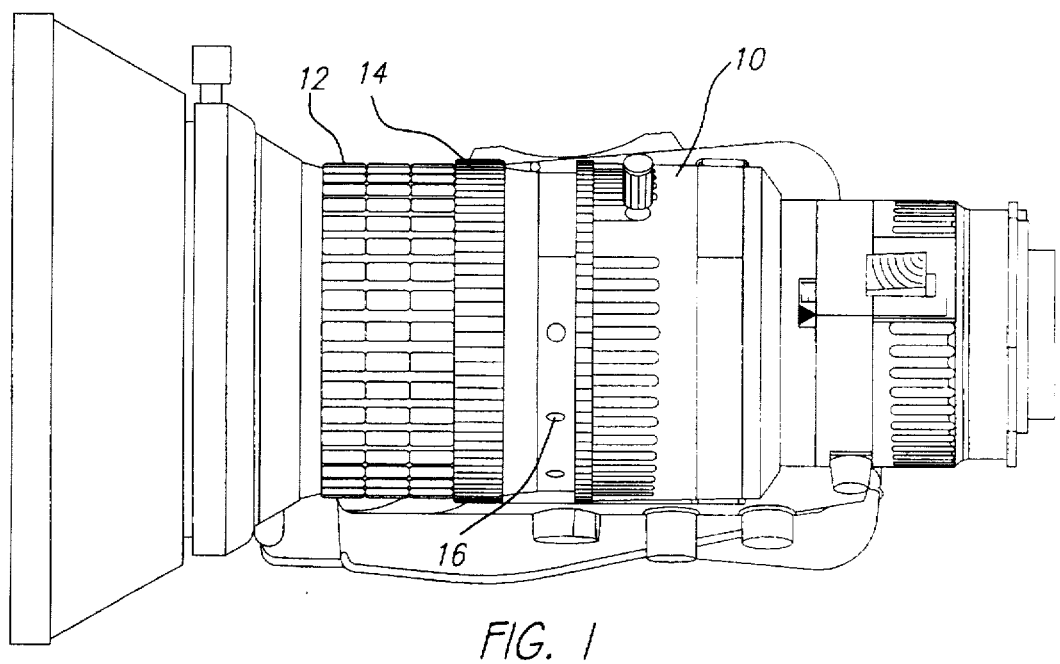
FIG. 1 is a side view of the camera lens.

Turning in detail to the drawings, a camera lens is illustrated in FIG. 1 which includes the lens housing 10 and a focus ring 12. The focus ring 12 is rotatably mounted about the lens housing 10 and, in this design, includes a ring portion 14 with splines for remote power focusing. The lens housing 10 is shown to include attachment holes 16 for a focus servo for powered focusing. FIG. 1 illustrates a typical focusing lens contemplated to be used with the present invention.

Figure 2:
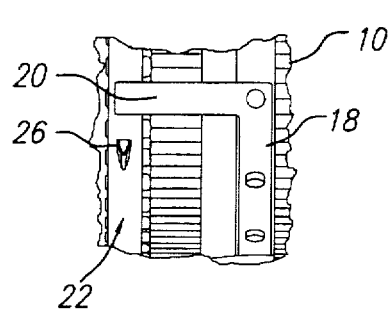
FIG. 2 is a portion of the camera lens of FIG. 1 with an adjustable rack focus stop thereon.

FIG. 2 illustrates a portion of the lens of FIG. 1 with an adjustable rack focus stop in place. An attachment body 18 is fixed to the attachment holes 16. An arm 20 is attached or integrally formed with the body 18. The arm 20 extends over and is displaced from the focus ring 12. A stop, generally designated 22, is defined by an adjustable band 24 with one or more upstanding catches 26. The arm 20 and a catch 26 are arranged such that the path of relative travel between the two will cause the catch 26 and the arm 20 to engage at a preselected location.

Figure 3:
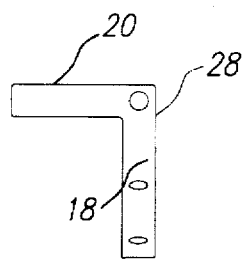
FIG. 3 is a plan view of an attachment body and arm.
Figure 4:
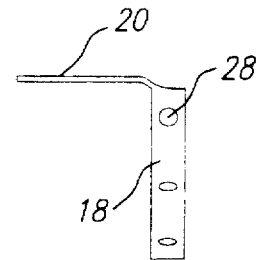
FIG. 4 is a side view of the attachment body and arm of FIG. 3.
Figure 5:
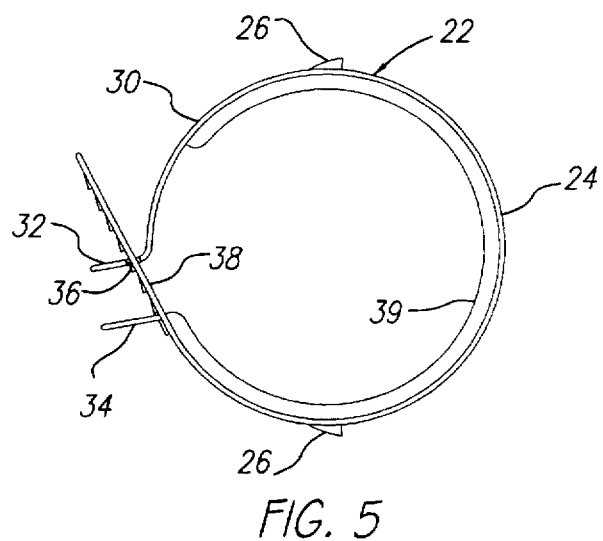
FIG. 5 is a side view of an adjustable stop ring.
Figure 6:
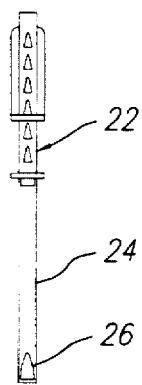
FIG. 6 is a front view of the ring of FIG. 5.

Looking to the attachment body 18 and arm 20, FIGS. 3 and 4 provide a plan and side view thereof. Holes 28 are provided in the attachment body 18 so that machine screws can be used to attach the attachment body 18 to the attachment holes 16 of the lens housing 10. The attachment body 18 otherwise is designed to avoid interference with the working of the lens. The arm 20 extends from the attachment body 18 and is raised from the attachment body 18 such that it is able to clear the splines 14 on the focus ring 12. The arm 20 extends perpendicularly to the attachment body 18 such that it is aligned longitudinally with the lens.

The stop 22 includes an adjustable band 24. The band 24 is of resilient spring steel and forms a circular arc 30. A tab 32 is located at a first end of the circular arc 30. A second tab 34 is located near the opposite end of the arc 30 from the tab 32. A locking hole 36 extends through the first tab 32 while an adjustable catch 38 with teeth extends from the second tab 34 to enter and engage the locking hole 36. An inner resilient liner 39 of rubber, felt or the like is arranged within the circular arc 30 to protect the surface of the focus ring and afford a secure grip.

In operation, the stop 22 is positioned about the focus ring 12 of the lens. Further, the attachment body 18 is attached by means of machine screws to the attachment holes 16 of the lens housing 10. The attachment body 18 is positioned on the lens housing 10 such that the arm 20 extends over the focus ring 12 and over the positioned stop 22. The camera is then positioned at the location where shooting is to take place and the lens is focused on the second object to be filmed. The focus ring 12 is retained in this position while the stop 22 is adjusted to place the catch 26 against the arm 20. The tabs 32 and 34 are then gripped with thumb and forefinger and squeezed. The resilient adjustable band 24 is constricted so that it becomes tight on the focus ring 12. The adjustable catch 38 extends through the locking hole 36 and the appropriate catch element engages the periphery of the locking hole. The stop 22 is thereby secured on the focus ring 12. The film or video camera is then focused on the first object and started to record an image. When it is appropriate to switch to the second object, the camera need not be turned off for refocusing. The focus ring 12 is simply rotated until the appropriate catch 26 of the stop 22 comes into contact with the arm 20. At this point, the second focus is achieved.

A second embodiment is illustrated in FIGS. 7, 8 and 9. A mounting ring 40 is contemplated which may be originally positioned on the camera lens when manufactured. Actually, the mounting ring 40 may be split and positioned at any time. The mounting ring includes a central track 42 running about the circumference. The ring 40 is to be positioned such that it lies beneath the arm 20 extending from the attachment body 18.

A catch body 44 is slidably positioned within the central track 42. The catch body 44 may run completely about the circumference of the mounting ring 40 in the central track 42. A set screw 46 may operate to selectively lock the catch body 44 in a selected position. Extending outwardly from the catch body 44 are two upstanding catches 48. The upstanding catches 48 are shown to be opposed and displaced from one another about the catch body 44. This placement allows a stop to be set for either a second focus further away or closer than the initial focus.

A third embodiment is illustrated in FIGS. 10 through 12. A mounting ring 50 similar to the mounting ring 40 is employed. Undercut portions, as best seen in FIG. 12, are provided in the central track 52. Multiple catch bodies 54 and 56 are arranged within the central track 52. The catch bodies 54 and 56 extend through a segment of the central track 42 with both bodies 54 and 56 not forming a complete circle. Consequently, the catch bodies 54 and 56 can be independently positioned. Set screws 58 again lock the components in place while upstanding catches 60 and 62 perform the stop function when appropriately positioned relative to the arm 20.

In operation, the third embodiment may be employed to accommodate the focus on a first object, refocusing on a second object and returning to that first object using the adjustable rack stops. One or the other of the objects is focused on and one of the catch bodies 44 is positioned against the arm 20. One of the set screws 58 is locked in place with the mounting ring 50. The other object is then focused on and the second catch body is similarly positioned and locked against the arm 20. Focus on one object, and then the other and then the first object again by simply selectively abutting the upstanding catches against the arm 20 provides for easy rack stops.

Accordingly, an improved focusing lens is disclosed through the inclusion of an adjustable rack focus stop.

Further, a method of providing rack focus with only one cameraman is disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. An adjustable rack focus stop for a camera lens having a lens housing and a focus ring rotatable on the lens housing, comprising an attachment body mountable to the camera lens;

an arm extending from the attachment body longitudinally of and displaced from the camera lens with the attachment body mounted to the camera lens;

a stop mountable to the camera lens to extend into the path of relative travel between the arm and the stop, the attachment body being mountable to one of the lens housing and the focus ring and the stop being mountable to the other of the lens housing and the focus ring.

2. The adjustable rack focus stop of claim 1, the attachment body being mountable to the lens housing, the stop being mountable to the focus ring.

3. The adjustable rack focus stop of claim 2, the stop including an adjustable band with an upstanding catch.

4. The adjustable rack focus stop of claim 1, the stop including an adjustable band with an upstanding catch.

5. The adjustable rack focus stop of claim 1, the stop including an adjustable band with upstanding catches.

6. The adjustable rack focus stop of claim 5, the adjustable band including a resilient band forming a circular arc with a first end having a tab extending outwardly of the circular arc and having a locking hole and a second end with a tab extending outwardly of the circular arc and an adjustable catch with teeth to engage the hole.

7. The adjustable rack focus stop of claim 6, the adjustable band further including an inner resilient liner on the resilient band.

8. The adjustable rack focus stop of claim 7, the resilient band being spring steel.

9. A camera lens comprising a lens housing;

a focus ring rotatable on the lens housing;

an arm mounted to the lens housing, extending longitudinally of the lens over and displaced from the focus ring;

an adjustable band adjustably mounted to the focus ring and including at least one catch upstanding from the band to extend into the path of relative travel between the arm and the band.

10. An adjustable rack focus stop for a camera lens having a lens housing and a focus ring rotatable on the lens housing, comprising an attachment body mountable to the lens housing;

an arm extending from the attachment body longitudinally of and displaced from the camera lens with the attachment body mounted to the lens housing;

a stop mountable to the focus ring to extend into the path of relative travel between the arm and the stop, the stop including a mounting ring having a central track and a catch body slidably mounted in the central track and having a lock to selectively fix the catch body within the central track.

11. The adjustable rack focus stop of claim 10, the catch body extending fully about the central track.

12. The adjustable rack focus stop of claim 10, the catch body extending partway around the central track.

13. The adjustable rack focus stop of claim 12 further comprising a second catch body arranged in the central track the catch body having an upstanding catch and the second catch body having a second upstanding catch, the first upstanding catch and the second upstanding catch being opposed.

14. A rack focus method for a focusing lens having a rotatable focus ring on a lens housing, comprising focusing on a second object;

securing a stop onto the focus ring against an arm on the lens housing with the focus on the second object;

focusing on a first object;

recording an image of the first object and the second object;

refocusing during the recording by moving the stop against the arm.

15. A rack focus method for a focusing lens having a rotatable focus ring and a lens housing, comprising focusing on a second object;

securing a stop onto the focus ring against an arm on the lens housing with the focus on the second object;

focusing on a first object;

securing a second stop onto the focus ring against the arm on the lens housing with the focus on the first object;

recording an image of the first object, the second object and the first object in seriatim;

refocusing during the recording by moving the stops against the arm.

* * * * *